CAPPING DEVICE

Original Filed May 2, 1956 2 Sheets-Sheet 1

CAPPING DEVICE

Original Filed May 2, 1956 2 Sheets-Sheet 2

United States Patent Office

Re. 24,695
Reissued Sept. 8, 1959

24,695

CAPPING DEVICE

Samuel Kirschenbaum, New York, N.Y.

Original No. 2,829,807, dated April 8, 1958, Serial No. 582,149, May 2, 1956. Application for reissue May 19, 1958, Serial No. 736,950

5 Claims. (Cl. 222—421)

Matter enclosed in heavy brackets [ ] appears in the original patent but forms no part of this reissue specification; matter printed in italics indicates the additions made by reissue.

This invention relates generally to the bottle closure art, and more particularly to an improved form of capping device for use in conjunction with liquid drop dispensing devices. Reference is made to Patent No. 2,411,435 entitled Liquid Dispensing Device, granted November 19, 1946, to S. Kirschenbaum which shows a typical application of the invention.

Liquid dispensing devices of the type disclosed in the above mentioned patent are used in connection with bottles for controlling the flow of liquid from the same, and are adapted to provide for the emptying of liquid containers in the form of drops flowing at a substantially uniform rate. The operation of such devices is dependent upon the maintenance of certain balances between the flow of air into the container, and the flow of liquid therefrom. Proper initial operation depends upon the passages of the device being free of liquid which might distort the above mentioned balance. While the devices disclosed in the above mentioned Patent No. 2,411,435 are generally satisfactory, it has been found that capping devices of conventional type are not suitable in those applications where it is necessary to shake the container of liquid to assure a uniform mixture of liquid before dispensing. During the shaking operation, the liquid dispensing passages become filled with liquid so that upon removal of the capping device and the tilting of the container to dispense the drops of liquid, the initial flow may be too fast for accurate drop count and control.

It has also been found that the conventional cap made of a rigid plastic and relying only upon pressure to seal is insufficient when used in conjunction with a bottle insert or fitment made of a non-rigid flexible plastic having the properties of polyethylene if the pressure is applied to sections of the fitment that are not supported by unyielding surfaces.

It is therefore among the principal objects of the present invention to provide an improved capping device for use in conjunction with drop dispensing devices of the class described in which the above mentioned difficulties are substantially eliminated.

Another object of the invention lies in the provision of improved capping construction which is adapted to seat tightly upon the drop dispensing device without damage to any of the relatively delicate parts thereof.

Another object of the invention lies in the provision of an improved capping device adapted for use in conjunction with a drop dispensing device possessed of the above enumerated advantages, in which the cost of fabrication may be of a reasonably low order, with consequent wide sale, distribution and use.

A feature of the invention lies in the fact that the same may be formed from a single molding of synthetic resinous material, with a complete absence of sealing gaskets, liners, and the like.

Another feature of the invention lies in the pockets of trapped air between interconnecting parts to provide an effective seal against the flow of liquids therethrough.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1:
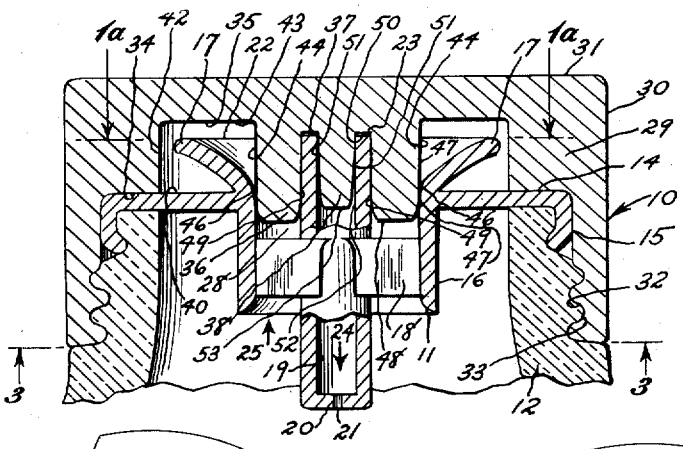
Figure 1 is a fragmentary vertical sectional view showing an embodiment of the invention in position upon a drop dispensing device.
Figure 2:
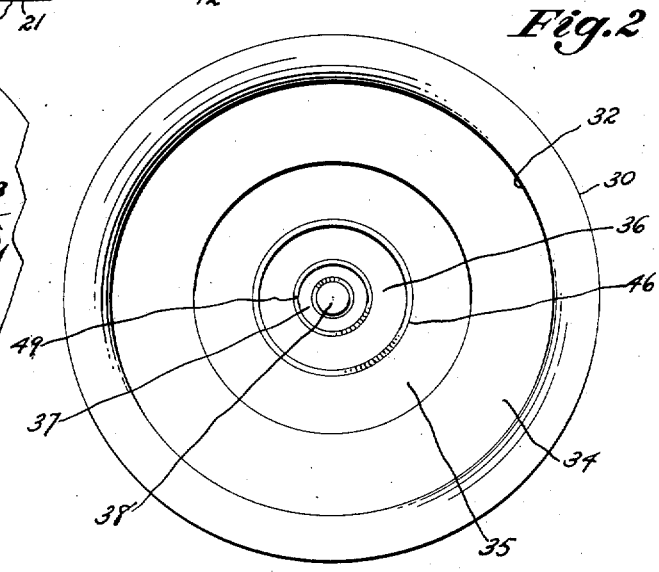
Figure 2 is a bottom plan view of the embodiment.
Figure 1A:
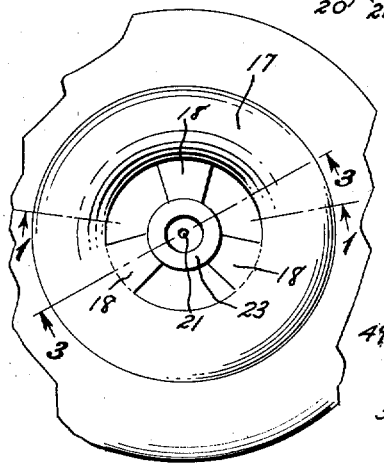
Figure 1A is a plan view as seen from the plane 1A—1A on Figure 1.

In accordance with the invention, the device, generally indicated by reference character 10 is shown in conjunction with a liquid dispensing device 11 disposed within the neck 12 of a liquid container (not shown). The construction and operation of the liquid dispensing device 11 is substantially as set forth in Patent No. 2,411,-435, and will therefore not be discussed in great detail herein. In accordance with said patent, the device 11 includes a neck engaging annular portion 15, an outer tubular member 16 having a flared portion 17 thereon, a perforated wall 18, and an inner tubular member 19 having a lower wall 20 thereon, the wall 20 having a vent 21 therein. In the device 11 illustrated, the upper edge 22 of the outer tubular member 16 and the upper edge 23 of the inner tubular member 19 are in co-planar relationship, but it is to be understood that such showing is purely exemplary, as the device 10 may be modified to accommodate those cases where the co-planar relationship does not exist. When in use, air flows in the direction of the arrow 24 through the vent 21 to permit liquid to flow in the direction indicated by the arrow 25 through the perforated wall 18 to form drops on the flared portion 17. If liquid is brought into the interstice 28 by necessary shaking or inadvertent handling, a quantity of liquid accumulates which is greatly in excess of the normal amount of liquid in the device required for efficient functioning. In the conventional cap, the whole fitment becomes filled with liquid which brings about this condition.

The device 10 is preferably formed by molding a suitable synthetic resin having the desired properties of strength and a limited degree of flexibility. Where the device 11 is formed from a relatively soft synthetic resin having the properties of polyethylene, the device 10 may be formed of a relatively harder synthetic resin, preferably of the phenol or styrene types. The device 10 includes a body 29 having an outer annular surface 30, an upper surface 31, a threaded surface 32 selectively engageable with threads 33 on the neck 12 and a first planar inwardly disposed surface 34 adapted to rest upon the flange 14 when in engaged position.

Adjacent the surface 34 is a first annular groove 35 of suitable cross section to permit the same to clear the flared portion 17 of the tubular member 16. In the embodiment shown on Figure 1, the groove is of generally rectangular cross section including outer surface 42, a bottom 43 and a partial inner surface 44. The depth of the groove 35 is such that when the surface 34 rests upon the upper surface 40 of the flange 14 the flared portion 17 is free of contact with any portion of the device 10.

Disposed adjacent the groove 35 is a first annular flange or projection 36 having a wedge shaped surface 46 thereon adapted to contact the reinforced junction between the flared portion 17 and the planar flange 14. An outer cylindrical surface 47 is adapted to slide within the interstice 28, while the rounded bottom surface 48 assures a smooth sliding fit. A similarly cylindrical inner surface 49 contacts the outer surface of the inner tubular member 19.

A second annular groove 37 is disposed adjacent the first annular projection 36 and includes a bottom surface 50 and an inner annular surface 51. The surface 51 merges with the outer cylindrical surface 52 of the axially or centrally disposed projection 38 which is provided with an end surface 53 adapted to penetrate the opening within the inner tubular member 19. As may be seen on Figure 1, the surface 50 is positioned so as to clear the upper edge 23 whereby a pocket of trapped air provides a seal similar to that provided by the annular groove 35. The above mentioned pocket may be eliminated, if desired, provided an effective seal is made at the upper end of the inner tubular member 19.

When the device 10 is engaged with the device 11 owing to a differential resilience between the component parts to the two devices a slight distortion occurs to provide an hermetic seal between the planar surface of the flange 14 and the surface 34. A second seal is made at the contact of the cylindrical surface 46 with the reinforced junction between the flared portion 17 and the planar flange 14. A third seal is made by the engagement of the surface 51 with the outer surface of the inner tubular member 19. Still another seal is formed by the engagement of the centrally disposed projection 38 with the inner tubular member. Air trapped within the groove 35 contributes to this effect in that no liquid can enter the groove without displacing the air, and the pressure of the air is such as to force liquid in the opposite direction. Thus, in closed condition, the container of liquid may be shaken vigorously without substantial accumulation of liquid, that is to say the liquid which accumulates is within the normal range for proper operation. Accordingly, it is possible to remove the device 10 from the device 11 and commence controlled flow of drops from the container of liquid in such a manner that drops are immediately formed.

Figure 3:
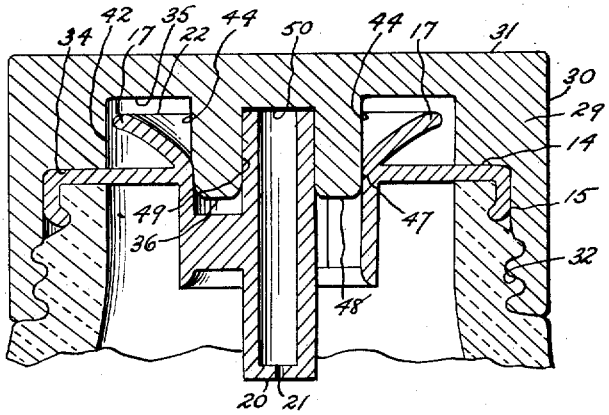
Figure 3 is a fragmentary sectional view, corresponding in most respects to that seen on Figure 1, but showing an alternate form of the embodiment.

Turning now to the alternate form of the invention as shown on Figure 3 of the drawing, the same differs from the principal form only in the omission of the centrally disposed projection 38. This form is particularly useful where the centrally disposed opening in the drop dispensing device is so small as to make the centrally disposed projection difficult to mold. In such cases, an adequate seal will be obtained without the presence of the centrally disposed projection. The elimination of the centrally disposed projection also saves the material which would normally be used to form the same, with a consequent simplification and reduction in molding costs.

In this form of the embodiment, owing to the close fitting of parts, upon the removal of the device 10 a suction is created in the inner tubular member which tends to empty some of the liquid lodged between the inner and outer tubular members. This action occurs to an even greater degree in the principal form.

Figure 4:
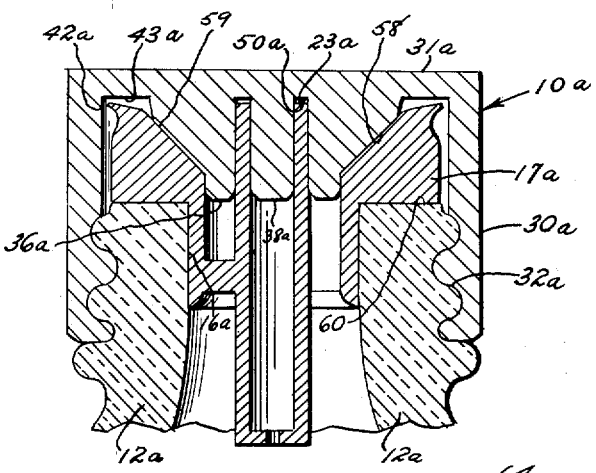
Figure 4 is a fragmentary sectional view, corresponding in most respects to that seen on Figure 1, but showing a second alternate form of the embodiment.

Turning now to the second alternate form of the embodiment as illustrated on Figure 4, parts corresponding to those of the principal form are designated with similar reference characters with the additional suffix "a."

The second alternate form of the invention differs from the principal form principally in that it is particularly adapted for use in liquid containers having relatively narrow neck portions. Accordingly, the outer tubular member 16a engages the inner surface of the neck 12a and the interstice 28 is sufficiently narrow that the major portion of the seal is effected by contact between the tapered surfaces 58 and 59. Here contact as shown is permissible without damage to the device 10, owing to the fact that the flared portion 17a is directly supported by the upper edge 60 of the neck 12a.

Figure 5:
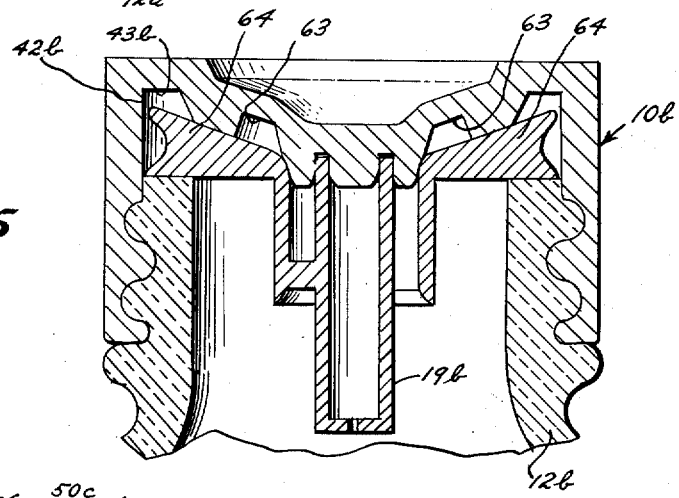
Figure 5 is a similar fragmentary sectional view showing a third alternate form of the embodiment.

Turning now to the third alternate form of the embodiment as illustrated on Figure 5, of the drawing, parts corresponding to those of the principal form have been designated by similar reference characters with the additional suffix "b." In this form, the inner tubular member 19b is lowered, to permit the device 10 to be inwardly recessed with a consequent saving of material comprising the cap. An additional air seal is formed within the groove 63, the annular projection 64 contacting a portion of the device 10b which is supported by the neck 12b of the liquid container.

Figure 6:
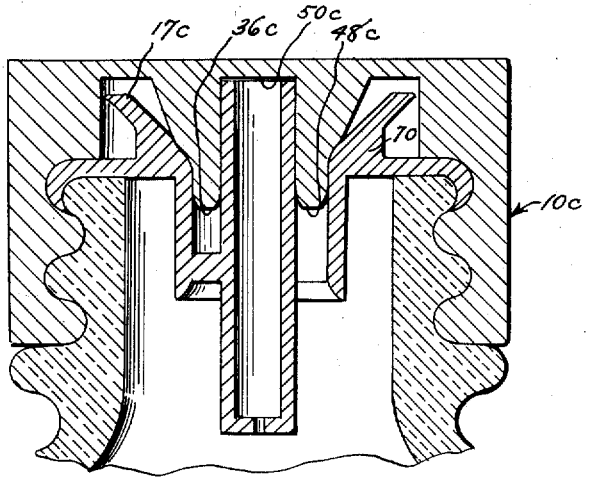
Figure 6 is a similar fragmentary sectional view showing a fourth alternate form of the embodiment.

Turning now to the fourth alternate form of the embodiment as illustrated on Figure 6 of the drawing, parts corresponding to those of the principal form of the embodiment have been designated by similar reference characters with the additional suffix "c." In this form of the embodiment, the seal between the flared portion 17c and the first annular projection 36c is partial as compared with a more complete seal as seen on Figure 4, and correspondingly, the flared portion is only partially reinforced by additional material indicated by reference character 70.

It may thus be seen that I have invented novel and highly useful improvements in capping devices of a type adapted to be used in conjunction with a drop dispensing device. Provision is made for the exclusion of undesirable accumulations of liquid within the drop dispensing device during such time as the container of liquid with which the drop dispensing device is used, is shaken or otherwise moved so as to cause liquid to otherwise lodge within the drop dispensing device. The capping device may be formed from a wide variety of suitable materials, and by resort to injection molding techniques the cost of the same may be maintained at a very low order.

I wish it to be understood that I do not consider the invention limited to the precise details of structure shown and set forth in this specification, for obvious modifications will occur to those skilled in the art to which the present invention relates.

I claim:

[1. A capping device for use with a liquid container as a closure therefor comprising: a generally annular body having a principal axis; said body having a planar surface disposed substantially perpendicularly with respect to said axis, a first annular groove disposed inwardly of said surface and substantially coaxially with respect to said principal axis, an annular projection disposed inwardly of said groove and substantially concentrically with respect to said principal axis; and a second annular groove disposed inwardly and concentrically with respect to said annular projection.]

[2. A capping device for use with a liquid container as a closure therefor comprising: a generally annular body having a principal axis; said body having a planar surface disposed substantially perpendicularly with respect to said axis, a first annular groove disposed inwardly of said surface and substantially coaxially with respect to said principal axis, an annular projection disposed inwardly of said groove and substantially concentrically with respect to said principal axis; and a second annular groove disposed inwardly and concentrically with respect to said annular projection; and a second centrally disposed projection disposed inwardly of said second groove.]

3. In combination, a liquid dispensing device and a capping device therefor; said liquid dispensing device comprising: a body having a principal axis, a planar surface disposed substantially perpendicularly with respect to said axis, first and second cylindrical tubes disposed concentrically with respect to said axis and forming a cylindrically shaped interstice therebetween; said capping device comprising a generally annular body having a principal axis, said body having a first planar surface disposed substantially perpendicular with respect to said axis, a first annular groove disposed inwardly of said surface and substantially coaxially with respect to said principal axis, a first annular projection disposed inwardly of said groove and concentrically with respect thereto, a second annular groove disposed inwardly and concentrically with respect to said first annular projection, and a second centrally disposed projection disposed inwardly of said second groove; said capping device being selectively engageable with said dispensing device in such a manner that said planar surfaces are in contact, in which position said first annular projection on said capping device is adapted to enter the interstice between said first and second cylindrical tubes.

4. In combination, a liquid dispensing device and a capping device therefor; said liquid dispensing device comprising: a body having a principal axis, a planar surface disposed substantially perpendicularly with respect to said axis, first and second cylindrical tubes disposed concentrically with respect to said axis and forming a cylindrically shaped interstice therebetween; said capping device comprising: a generally annular body having a principal axis, said body having a first planar surface disposed substantially perpendicular with respect to said axis, a first annular groove disposed inwardly of said surface and substantially coaxially with respect to said principal axis, a first annular projection disposed inwardly of said groove and concentrically with respect thereto, a second annular groove disposed inwardly and concentrically with respect to said first annular projection; said capping device being selectively engageable with said dispensing device in such a manner that said planar surfaces are in contact, in which position said first annular projection on said capping device is adapted to enter the interstice between said first and second cylindrical tubes.

*5. In combination a liquid dispensing device and a capping device therefor; said liquid dispensing device being formed of a soft synthetic resin and having a principal axis and including a generally laterally extending planar flange, an annular bottle neck engaging portion on the periphery of said planar flange and a tubular member having a principal axis coincident with said principal axis and disposed substantially perpendicular to the plane of said planar flange, said tubular member including a flared portion thereon; said capping device being formed of a synthetic resin having a greater degree of resiliency and a lesser degree of flexibility than said liquid dispensing device, and having means thereon for engagement with a bottle neck, a planar inwardly disposed surface adapted to contact said planar flange of said liquid dispensing device substantially at the peripheral areas thereof and an annular groove formed therein including outer and inner surfaces interconnected by a bottom surface; said capping device when in engaged position clearing said flared portion of said tubular member, said inner cylindrical surface resiliently contacting the inner surface of said tubular member, the depth of penetration of said tubular member by said inner wall being determined by the engagement of said planar inwardly disposed surface of said capping device with said planar flange of said liquid dispensing device.*

*6. In combination a liquid dispensing device and a capping device therefor; said liquid dispensing device being formed of a soft synthetic resin and having a principal axis and including a generally laterally extending planar flange, an annular bottle neck engaging portion on the periphery of said planar flange, and a tubular member having a principal axis coincident with said principal axis and disposed substantially perpendicular to the plane of said planar flange, said tubular member including a flared portion thereon; said capping device being formed of a synthetic resin having a greater degree of resiliency and a lesser degree of flexibility than said liquid dispensing device, and having threaded means thereon for engagement with a bottle neck and a planar inwardly disposed surface adapted to contact said planar flange of said liquid dispensing device substantially at the peripheral areas thereof; said capping device including an annular groove formed therein including outer and inner surfaces interconnected by a bottom surface, and when in engaged position clearing said flared portion of said tubular member, said inner cylindrical surface resiliently contacting the inner surface of said tubular member, the depth of penetration of said tubular member by said inner wall being determined by the engagement of said planar inwardly disposed surface of said capping device with said planar flange of said liquid dispensing device.*

*7. In combination a liquid dispensing device and a capping device therefor; said liquid dispensing device being formed of a soft synthetic resin and having a principal axis and including a generally laterally extending planar flange, an annular bottle neck engaging portion on the periphery of said planar flange, and a tubular member having a principal axis coincident with said principal axis and disposed substantially perpendicular to the plane of said planar flange, said tubular member including a flared portion thereon; said capping device being formed of a synthetic resin having a greater degree of resiliency and a lesser degree of flexibility than said liquid dispensing device, and having threaded means thereon for engagement with a bottle neck and a planar inwardly disposed surface adapted to contact said planar flange of said liquid dispensing device substantially at the peripheral areas thereof; said capping device including an annular groove formed therein including outer and inner coaxially disposed cylindrical surfaces interconnected by a bottom surface; said capping device when in engaged position clearing said flared portion of said tubular member, said inner cylindrical surface resiliently contacting the inner surface of said tubular member, the depth of penetration of said tubular member by said inner wall being determined by the engagement of said planar inwardly disposed surface of said capping device with said planar flange of said liquid dispensing device.*

References Cited in the file of this patent or the original patent

UNITED STATES PATENTS

| | | |
|---|---|---|
| 1,714,211 | Brownlee et al. | May 21, 1929 |
| 1,854,451 | Cooney | Apr. 19, 1932 |
| 2,411,435 | Kirschenbaum | Nov. 19, 1946 |
| 2,689,665 | Martin | Sept. 21, 1954 |
| 2,690,861 | Tupper | Oct. 5, 1954 |
| 2,831,613 | Soffer | Apr. 22, 1958 |

FOREIGN PATENTS

| | | |
|---|---|---|
| 64,527 | Germany | Sept. 16, 1892 |